(12) United States Patent
Shih

(10) Patent No.: US 6,182,902 B1
(45) Date of Patent: Feb. 6, 2001

(54) DEVICE AND METHOD FOR AUTOMATICALLY CONTROLLING ROTATING SPEED OF FAN COOLER

(75) Inventor: Min-Tien Shih, Taipei (TW)

(73) Assignee: Mitac Technology Corp., Hsinchu (TW)

( * ) Notice: Under 35 U.S.C. 154(b), the term of this patent shall be extended for 0 days.

(21) Appl. No.: 09/358,831

(22) Filed: Jul. 22, 1999

(30) Foreign Application Priority Data

Jul. 23, 1998 (TW) .................................. 87112075

(51) Int. Cl.[7] .................................................. G05D 23/00
(52) U.S. Cl. .................. 236/35; 236/78 B; 236/78 D; 236/DIG. 9; 165/299; 631/695
(58) Field of Search ...................... 236/35, 78 B, 236/49.3, DIG. 9, 78 D; 165/203, 80.3, 299, 300; 361/695, 697

(56) References Cited

U.S. PATENT DOCUMENTS

| | | | |
|---|---|---|---|
| 4,425,766 | * 1/1984 | Claypole | 236/35 X |
| 4,560,106 | * 12/1985 | Dorsch | 165/203 X |
| 5,226,729 | * 7/1993 | Alford | 236/78 B X |
| 5,234,050 | * 8/1993 | Weigert | 236/49.3 X |
| 5,718,373 | * 2/1998 | Kim et al. | 236/35 |

* cited by examiner

Primary Examiner—Harry B. Tanner
(74) Attorney, Agent, or Firm—Darby & Darby

(57) ABSTRACT

A thermal control method and device for automatically regulating the rotational speed of the fan cooler are disclosed in the present invention. The thermal control device comprises a control-voltage generator having a temperature-sensing device for sensing a temperature and generating a control voltage, a pulse modulator for modulating the pulse width of a clock signal with respect to the control voltage to generate a pulse modulation signal, and a fan driver for regulating the rotational speed of the fan cooler, modulating the refrigerant efficiency, and maintain the internal temperature of an apparatus, thereby consuming moderate power and making less noise.

12 Claims, 3 Drawing Sheets

DEVICE AND METHOD FOR AUTOMATICALLY CONTROLLING ROTATING SPEED OF FAN COOLER

BACKGROUND OF THE INVENTION

1. Field of the Invention

The present invention generally relates to a thermal control method and device, and in particular to a method and device to regulate the rotational speed of a fan cooler by thermal control, whereby the fan cooler can be actively adjusted to work at an appropriate speed to maintain the inner temperature of an apparatus within a selected moderate temperature range. Thereby, a balance between temperature reduction and power consumption can be achieved.

2. Description of Related Art

Heat is always generated while ordinary electronic equipment is turned on. For example, a personal computer having a high-speed microprocessor will generate a large amount of heat. Various devices for reducing temperature have been developed to avoid the negative effects of excess heat on electronic devices, such as a shortening of component lifetime and malfunction.

There are two general types devices for dissipating heat. One uses a mechanical structure, such as a radiator plate or a conduction heat plate, to perform heat dissipation. The refrigerant efficiency depends on the contact area between the heat generating component, such as the heating microprocessor, and a radiator or a heat conduction plate. Generally speaking, the refrigerant efficiency is higher when the contact area is larger, and vise versa. However, the application of such a mechanical structure for heat dissipation in portable electronic devices (for example, notebook computers) is restricted by the limited volume available to each component equipped therein because a large contact area is not feasible. When the operational speed of the portable electronic device becomes very fast, a limited contact area may be too small to achieve the purpose of heat dissipation.

The other type of heat dissipating device uses a fan cooler or a cooling installation to dissipate heat. Fan coolers are usually applied in portable electronic devices which need high refrigerant efficiency due to their smaller volume.

Most fan coolers used in portable electronic devices are powered by a constant voltage in either a turned on or off state, and whether or not the fan cooler starts to dissipate heat is determined by a control mechanism of the portable electronic device. But there are several disadvantages in the foregoing fan of the prior art. First, unlike the radiator plate, the fan cooler must be powered to rotate as fast as possible in order to effect heat dissipation, so a portion of the limited electric power stored in the portable electronic device will be consumed. This negatively impacts the ability of portable electronic devices to strictly control power consumption. In addition, fan coolers rotating at the full speed will make a significantly loud noise, which is also a problem that needs to be resolved.

SUMMARY OF THE INVENTION

It is therefore an object of the present invention to provide a thermal control method and device for automatically regulating the rotational speed of the fan. By the present invention, heat can be dynamically dissipated by the fan cooler in response to the inner temperature of the electronic device, whereby a balance between refrigerant efficiency and power consumption can be achieved, and the problem of the fan cooler noise can also be improved.

A first thermal control device for automatically regulating the rotational speed of the fan cooler of the present invention comprises a control-voltage generator having a means for sensing temperature, such as a thermister, for sensing an inner temperature of the electronic device and then generating a control-voltage corresponding to the inner temperature; a pulse modulator, like a pulse width modulator, coupled to the control-voltage generator for modulating the pulse width of a clock signal with respect to the control-voltage to generate a pulse modulation signal; and a fan driver for regulating the rotational speed of the fan cooler to modulate the refrigerant efficiency so as to reduce power consumption and fan noise.

Besides, in the thermal control device, the means for sensing temperature may include regional sensors. The regional sensors is distributed over different regions of the electronic device to sense regional temperatures. The control-voltage may be generated by a weighted summation of the relative control-voltages in response to the sensed regional temperatures.

A second thermal control device for automatically regulating the rotational speed of the fan cooler of the present invention includes control-voltage generators, wherein each has a related sensor located in an individual region to sense a temperature and a relative control-voltage is generated in response to the temperature; a weighted circuit connected to the control-voltage generators to receive all the relative control-voltages in response to the sensed regional temperatures and gives a respective weighted-coefficient to each control-voltage to generate a weighted control voltage; a pulse modulator connected to the weighted circuit to receive a clock signal and modulate the pulse width of the clock signal with respect to the weighted control voltage to generate a corresponding pulse modulation signal; and a fan driver connected to the pulse modulator to adjust the rotational speed of the fan cooler by the pulse modulation signal, whereby the refrigerant efficiency can be maintained and the balance between temperature reduction and power consumption can be achieved, and fan noise will be reduced.

Furthermore, a thermal control method for automatically regulating the rotational speed of the fan cooler comprises the following steps. First, with a means of sensing temperature, inner temperatures in an electronic device are sensed. A control-voltage is generated in response to the inner temperatures. The pulse width of a clock signal with respect to the control-voltage generates a relative pulse modulation signal. At last, the rotational speed of the fan cooler is regulated by the pulse modulation signal and the refrigerant efficiency in the electronic device can be controlled.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

In the thermal control device for automatically regulating the rotational speed of the fan cooler of the present invention, a means for sensing temperature (a thermister in the first embodiment) is used to sense the inner temperature of the electronic device, and then a pulse modulation signal is generated to control the rotational speed of the fan cooler according to the sensed inner temperature. Therefore, the thermal control device can actively perform a continuous modulation of the rotational speed corresponding to the thermal change in the electronic device, i.e., if the inner temperature of the electronic device is raised, the rotational speed of the fan cooler becomes faster to increase the refrigerant efficiency; if the inner temperature of the electronic device is lowered, the rotational speed of the fan cooler becomes slower to reduce the refrigerant efficiency to decrease the power consumption of the fan cooler and decrease the loud noise.

Figure 1:
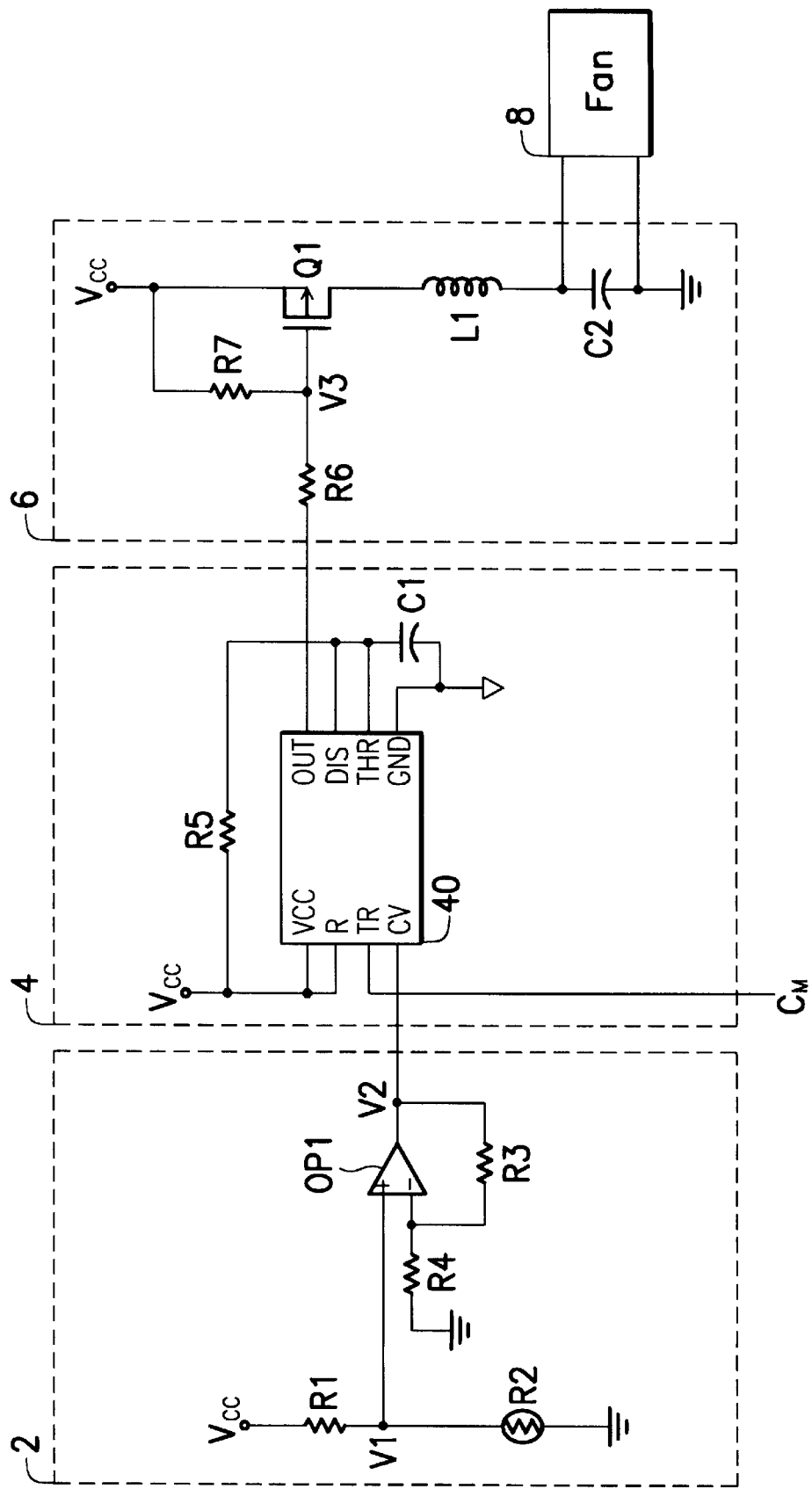
FIG. 1 shows a detailed circuit diagram of a thermal control device for automatically regulating the rotational speed of the fan cooler in a first preferred embodiment in accordance with the present invention.

Referring to FIG. 1, a thermal control device of the first embodiment in accordance with the present invention comprises a control-voltage generator 2, a pulse modulator 4, and a fan driver 6 for dynamically regulating the rotational speed of a fan cooler 8 corresponding to the inner temperature of an electronic device.

The control-voltage generator 2 includes a resister R1, a thermister R2, and an amplifier circuit having resisters R3, R4 and an amplifier OP1. As shown in FIG. 1, the resister R1 is series-connected to the thermister R2 and both are coupled between a voltage source $V_{CC}$ and the ground. A voltage V1 between the resister R1 and the thermister R2 can be represented as V1=R2×$V_{CC}$/(R1+R2).

In this embodiment, the thermister R2, which is located in a specific position in the electronic device, is used to sense the inner temperature, and its resistance changes along with the temperature change. Hence, because the resistance of the resister R1 is constant, the voltage V1 is varied with the resistance of thermister R2. In fact, the voltage V1 indicates the inner temperature of the electronic device. Next, the voltage V1 is applied to a non-inverting terminal of the amplifier OP1. According to the resistance ratio of resisters R3 to R4, the voltage V1 will be modulated to a control-voltage V2, and the control-voltage V2 is applied to the pulse modulator 4.

The pulse modulator 4 includes a pulse width modulator 40, a resister R5, and a capacitor C1. In response to the control-voltage V2, the pulse modulator 4 modulates the width of a clock signal $C_M$ to generate a pulse modulation signal V3. In this embodiment, the pulse width modulator 40 is an IC LM550, and a resister R5 and a capacitor C1 are around the IC LM550. For the practitioners skilled in the art, modifications and variations of the pulse modulator 4 are allowed as long as the pulse-width modulation controlled by the control-voltage V2 can be processed.

In the pulse width modulator 40, terminals VCC and R are connected to the voltage source $V_{CC}$, and a terminal TR is used to receive the clock signal $C_M$, which is ready to be modulated by the pulse width modulator 40. A terminal GND is connected to the ground, the resister R5 is located between terminals DIS, THR and the voltage source $V_{CC}$, and the capacitor C1 is located between terminals DIS, THR and the terminal GND. The pulse modulation signal V3 is output from a terminal OUT. The operation of the pulse width modulator 40 will be described as follows. First, the control-voltage V2 is received from the control-voltage generator 2 through a terminal CV of the pulse width modulator 40 and the clock signal $C_M$ is sent to the terminal TR. Afterwards the pulse width of the clock signal $C_M$ is modulated according to the control-voltage V2. Then, the modulated width of each pulse in the clock signal $C_M$ is created in response to the inner temperature of the electronic device.

The fan driver 6 adjusts the rotational speed of the fan cooler 8 based on the pulse width of the pulse modulation signal V3. Namely, the refrigerant efficiency is modulated by controlling the rotational speed of the fan cooler 8 in order to maintain the inner temperature of the electronic device. As shown in FIG. 1, the fan driver 6 of the first preferred embodiment comprises resisters R6 and R7, a transistor Q1, an inductor L1, and a capacitor C2, wherein the resister R6 and R7 and the inductor L1 form a switch circuit. The base of the transistor Q1 receives the pulse modulation signal V3 from the pulse modulator 4 through the resister R6. Thus, the transistor Q1 is turned on and when the pulse modulation signal V3 is on a high logic level, and the voltage source $V_{CC}$ is applied to a resonance series circuit formed by the inductor L1 and the capacitor C2. The voltage across the capacitor C2 will change according to the inner temperature of the electronic device to modulate the rotational speed of the fan cooler 8.

The resistance of the thermister R2 varies with the inner temperature of the electronic device in an inverse proportion, i.e., the resistance is lowered when the temperature is raised, and the resistance is increased when the temperature is reduced. Similarly the voltage V1 varies with the thermister R2, and the pulse width of the clock signal V3 will change after the clock signal V3 passes the pulse modulator 4. In the end, we can achieve the purposes of the present invention to modulate the rotational speed of the fan cooler 8 by turning on/off the transistor Q1.

Figure 2:
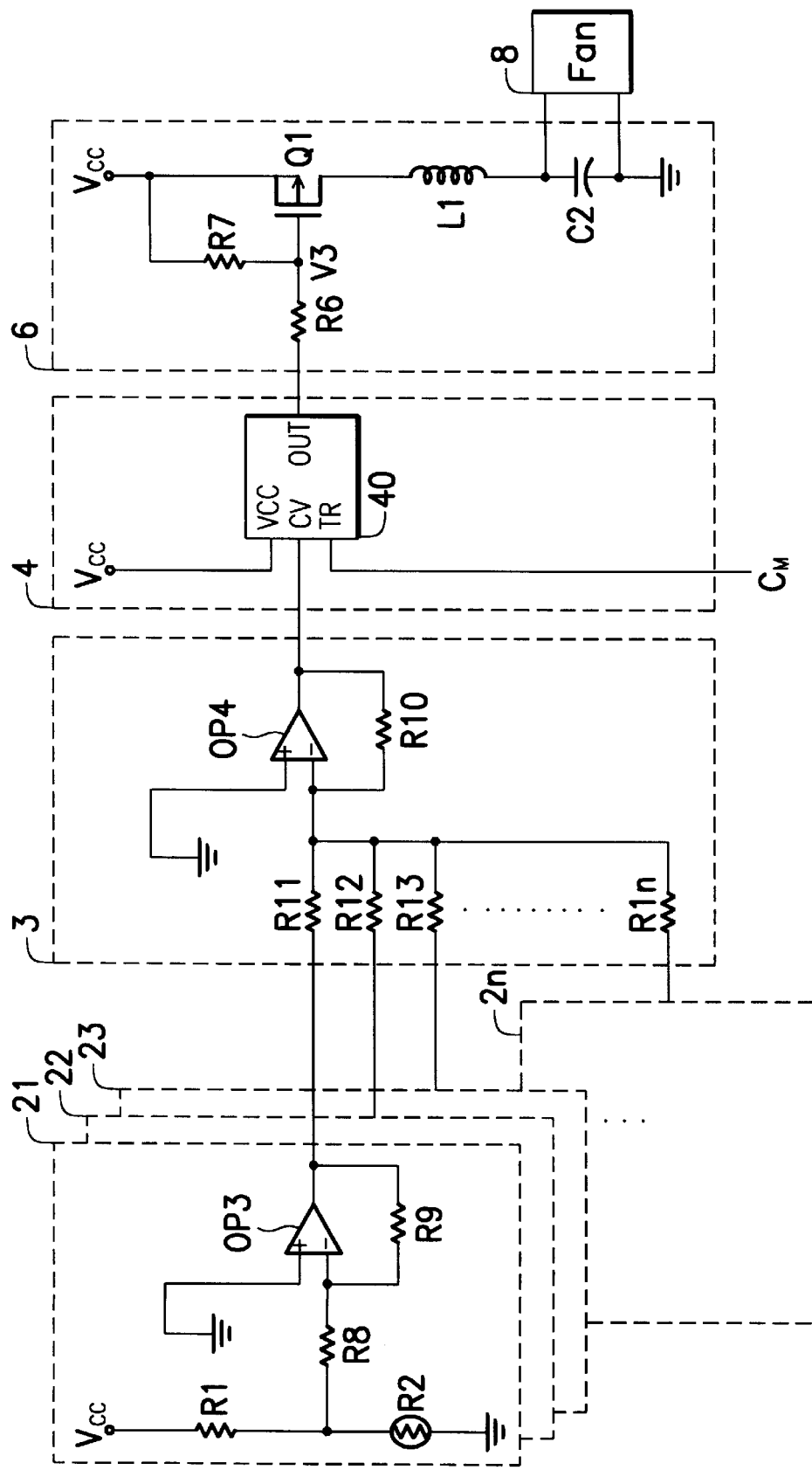
FIG. 2 shows a detailed circuit diagram of a thermal control device for automatically regulating the rotational speed of the fan cooler in of a second preferred embodiment in accordance with the present invention.

FIG. 2 shows a detailed circuit about the second referred embodiment of the present invention. One difference between the first and the second embodiments is the way the inner temperature of the electronic device is sensed. As shown in FIG. 2., the thermal control device for automatically regulating the rotational speed of the fan cooler includes control-voltage generators 21~2n, a weighted circuit 3, a pulse modulator 4, and a fan driver 6. In the second embodiment, thermisters in the control-voltage generator 21~2n sense different regions in the electronic device to generate corresponding control-voltages, respectively. Then a weighted control voltage is generated by the weighted circuit 3 which is capable of summing up said corresponding control-voltages after being weighted. As with the control-voltage in the first embodiment, the weighted control voltage will be applied to the pulse modulator 4 and the fan driver 6 to modulate the rotational speed of the fan cooler 8.

The control-voltage generator 21 includes a resister R1, a thermister R2, and an amplifier circuit having resisters R8, R9 and an amplifier OP3. The control-voltage generator 21 works similarly to the control-voltage generator 2 in FIG. 1, but the voltage across the thermister R2 in the second embodiment is (R8+R2)×$V_{CC}$/(R8+R2+R1).

According to the change in resistance of the thermister R2 corresponding to the regional temperature, a control-voltage is generated by the control-voltage generator 21. Other control voltage circuits 22~2n are similar to the control voltage circuit 21 in circuit construction and function, so no further description of their inner operation will be given.

All control-voltages from the control-voltage generators 21~2n are weighted and summed in the weighted circuit 3 to generate a weighted control voltage in response to the integrated temperature in the electronic device. The weighted circuit 3 comprises resisters R11~R1n, each with a respective control-voltage weighted value, a resister R10, and an amplifier OP4. If the control-voltages generated from the control-voltage generators 21~2n are V21~V2n, then the weighted control voltage V4 can be represented as V4=−R10×(V21/R11+V22/R12+ . . . +V2n/R1n).

Figure 3:
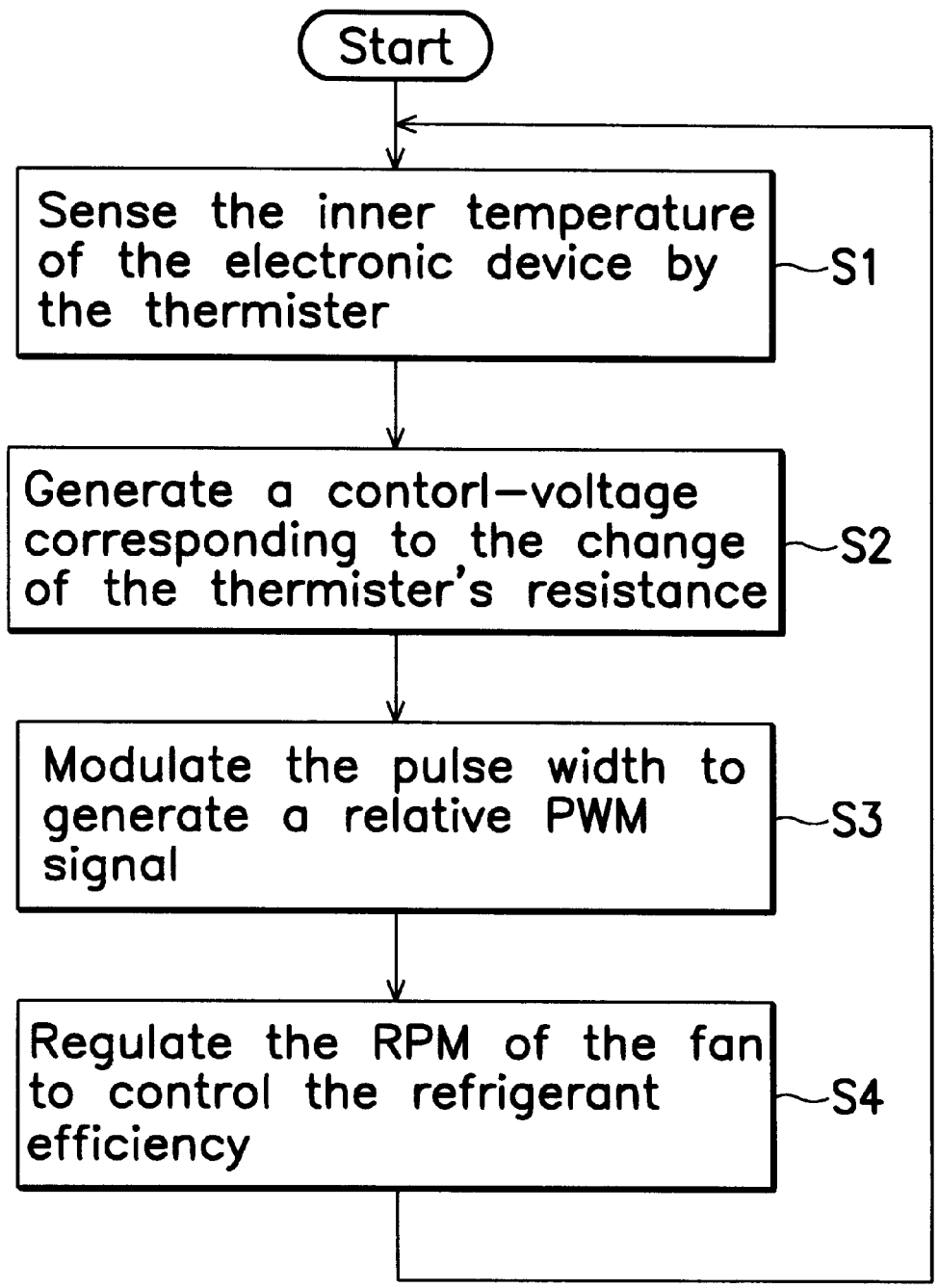
FIG. 3 shows a flow chart of a thermal control method for automatically regulating the rotational speed of the fan cooler with respect to the present invention.

Through the weighted control-circuit 3, the variation of the weighted control voltage V4 may implies the inner temperature of the electronic device as calculated from regional temperatures sensed by each thermister R2 in the control-voltage generators 21~2n. By means of the pulse modulator 4 and the fan driver 6 as in the first embodiment, the rotational speed of the fan cooler can be dynamically regulated to reach the balance of power consumption and temperature reduction. The flow chart of the thermal control method for dynamically regulating the rotational speed of the fan cooler is shown in FIG. 3. First, the inner temperature of the electronic device (for example, like a notebook computer) is sensed by one or a plurality of thermisters (S1). In the step S1, the resistance of the thermister varies with the sensed temperature, and a control-voltage corresponding to the change of the sensed temperature, i.e., the sensed resistance of the thermister, is generated (S2). The control-voltage is applied to a pulse modulator for modulating the pulse width of a modulating-clock to generate a PWM signal (S3), wherein the "PWM" represents the pulse modulation signal shown in the first or second embodiment. Finally, the RPM (revolutions per minute), i.e. the rotational speed, of the fan cooler will be regulated by the PWM signal and the refrigerant efficiency can be controlled.

The foregoing description of preferred embodiments of the present invention has been provided for the purposes of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to understand the invention and to practice various other embodiments and make various modifications suited to the particular use contemplated. It is intended that the scope of the invention be defined by the following claims or their equivalents.

What is claimed is:

1. A device for controlling a rotational speed of a fan cooler attached to an apparatus, the device comprising:

a plurality of control-voltage generators, each of which having a sensing means for sensing a local temperature and generating a local control voltage corresponding to the local temperature;

a weighted circuit comprising a plurality of resisters, each of the resisters comprising a weighting coefficient wherein the weighted circuit generates a weighted control voltage by a summation of the local control voltages multiplied by the respective weighting coefficients;

a pulse modulator for modulating a clock signal responsive to the control voltage into a pulse modulation signal; and a fan driver for controlling the rotational speed of the fan cooler in response to the pulse modulation signal.

2. The device as claimed in claim 1, wherein the sensing means is a thermister.

3. The device as claimed in claim 2, wherein the control voltage generator includes a first resister connected in series to the thermister and powered by a voltage source such that the control-voltage is proportional to a voltage across the thermister.

4. The device as claimed in claim 1, wherein the pulse modulator is a pulse width modulator.

5. The device of claim 1 wherein the sensing means comprises a plurality of sensors distributed across the apparatus to obtain an average temperature.

6. The device of claim 1 wherein the apparatus is a notebook computer.

7. A method for controlling a rotational speed of a fan cooler attached to an apparatus, comprising the steps of:

sensing a local temperature of the apparatus and generating a local control voltage by each of a plurality of sensing means;

generating a weighting coefficient for each of the local control voltages;

generating a weighted control voltage by summing the local control voltages multiplied by the respective weighting coefficients;

modulating a clock signal responsive to the weighted control voltage into a pulse modulation signal; and varying the rotational speed of the fan cooler in response to the pulse modulation signal.

8. The method as claimed in claim 7, further comprising the step of sensing an average temperature by distributing a plurality of sensors over the apparatus.

9. The method as claimed in claim 7, wherein the sensing means is a thermister.

10. The method as claimed in claim 7, wherein the step of modulating the clock signal is implemented by pulse width modulation.

11. The method of claim 7 further comprising the step of powering a first resister when generating the control voltage that is proportional to a voltage across the sensing means.

12. The method of claim 7 wherein the apparatus is a notebook computer.

* * * * *